MAGNETIC SWITCHING SYSTEM

Filed May 24, 1952 4 Sheets-Sheet 1

INVENTOR
Jan A. Rajchman
BY Morris A. Rabkin
ATTORNEY

Feb. 7, 1956 J. A. RAJCHMAN 2,733,860

MAGNETIC SWITCHING SYSTEM

Filed May 24, 1952 4 Sheets-Sheet 2

INVENTOR
Jan A. Rajchman
BY [signature]
ATTORNEY

Feb. 7, 1956 J. A. RAJCHMAN 2,733,860

MAGNETIC SWITCHING SYSTEM

Filed May 24, 1952 4 Sheets-Sheet 3

INVENTOR
Jan A. Rajchman
BY
[signature]
ATTORNEY

Feb. 7, 1956 J. A. RAJCHMAN 2,733,860

MAGNETIC SWITCHING SYSTEM

Filed May 24, 1952 4 Sheets-Sheet 4

INVENTOR
Jan A. Rajchman
BY Morris L. Rabkin
ATTORNEY

United States Patent Office 2,733,860
Patented Feb. 7, 1956

2,733,860

MAGNETIC SWITCHING SYSTEM

Jan A. Rajchman, Princeton, N. J., assignor to Radio Corporation of America, a corporation of Delaware Application May 24, 1952, Serial No. 289,913
17 Claims. (Cl. 235—61)

Figure 1:
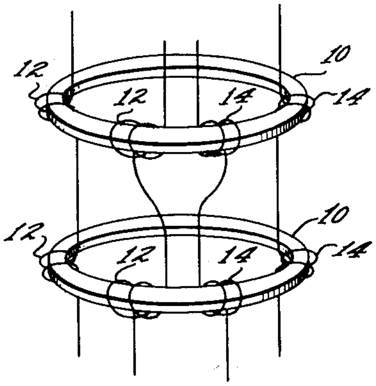

This invention relates to switching devices and more particularly to an improved magnetic switching system.

Any switching operation can be generally defined as a definite correspondence function between a certain number of inputs and a certain number of outputs. Apparatus to provide such a correspondence function has been described in Patents Nos. 2,428,211 and 2,428,212 to J. A. Rajchman, wherein resistance matrices have been used. A rectifier system for performing switching operations is described in "Rectifier Networks for Multiposition Switching" by Brown and Rochester in the February, 1949, Proceedings of the I. R. E. There also may be found in the literature descriptions of function matrices using multigrid tubes, triodes and vacuum diodes.

While these switching systems are adequate to perform the switching functions for which they were designed, there are inherent limitations in the apparatus employed. These limitations consist of component failures, tubes and crystals do not require continual surveillance to try to anticipate failures, excessive power dissipation with components used, and a limited life for the components, other than resistors.

It is an object of this invention to provide a novel switching system, which has substantially unlimited life.

It is a further object of the present invention to provide a novel switching system which is substantially free of failures.

Still a further object of the present invention is to present an improved switching system which is highly efficient.

Another object of this invention is to provide an improved, novel and simple switching system.

In an application by this inventor for "Magnetic Matrix and Computing Devices" which was filed March 8, 1852, Serial No. 275,622, there is described and claimed a novel magnetic switch. This consists of a number of toroidal cores of magnetic material and a number of coils. The magnetic material selected for the toroidal cores is preferably of the type having a substantially rectangular hysteresis loop. Each of the coils is inductively coupled to different ones of the magnetic elements or cores by windings. The sense of the windings as well as the elements to which a coil is coupled are determined in accordance with a desired code. The code is selected so that any one of the magnetic cores may be driven from a given starting polarity to the opposite polarity by exciting, with current, selected ones of the coils so that the core selected to be driven is the one which receives magnetomotive forces only from coil windings having a sense to provide the required drive, and from no coil windings of the opposite sense. Each of the cores has a winding, referred to as an output winding, in which a voltage is induced when the core, to which the winding is coupled, is turned over. A restoring coil is coupled to each one of the cores and has an exciting current applied to it to restore all cores to a given initial polarity.

The present invention also employs a plurality of magnetic toroidal cores and a plurality of coils. These are divided into two groups. The first group consists of input windings which are inductively coupled to different ones of the magnetic elements by windings, the sense of the winding as well as the elements to which a coil is coupled being determined in accordance with a first combinatorial code. The second group consists of output windings which are inductively coupled to different ones of the magnetic cores by windings, the sense of the winding as well as the elements to which a coil is coupled being determined in accordance with a second combinatorial code which is functionally related to the first code. Accordingly, excitation of selected ones of the input coils turns over only one core with the result that voltages are induced in only those output coils which are inductively coupled to that core. Therefore, the application of currents to the input coils in accordance with one code results in a certain output voltage pattern in accordance with the desired interrelationship of the first and second codes. A coil which is inductively coupled to all cores serves to restore all the cores to a given initial polarity.

Figure 2:
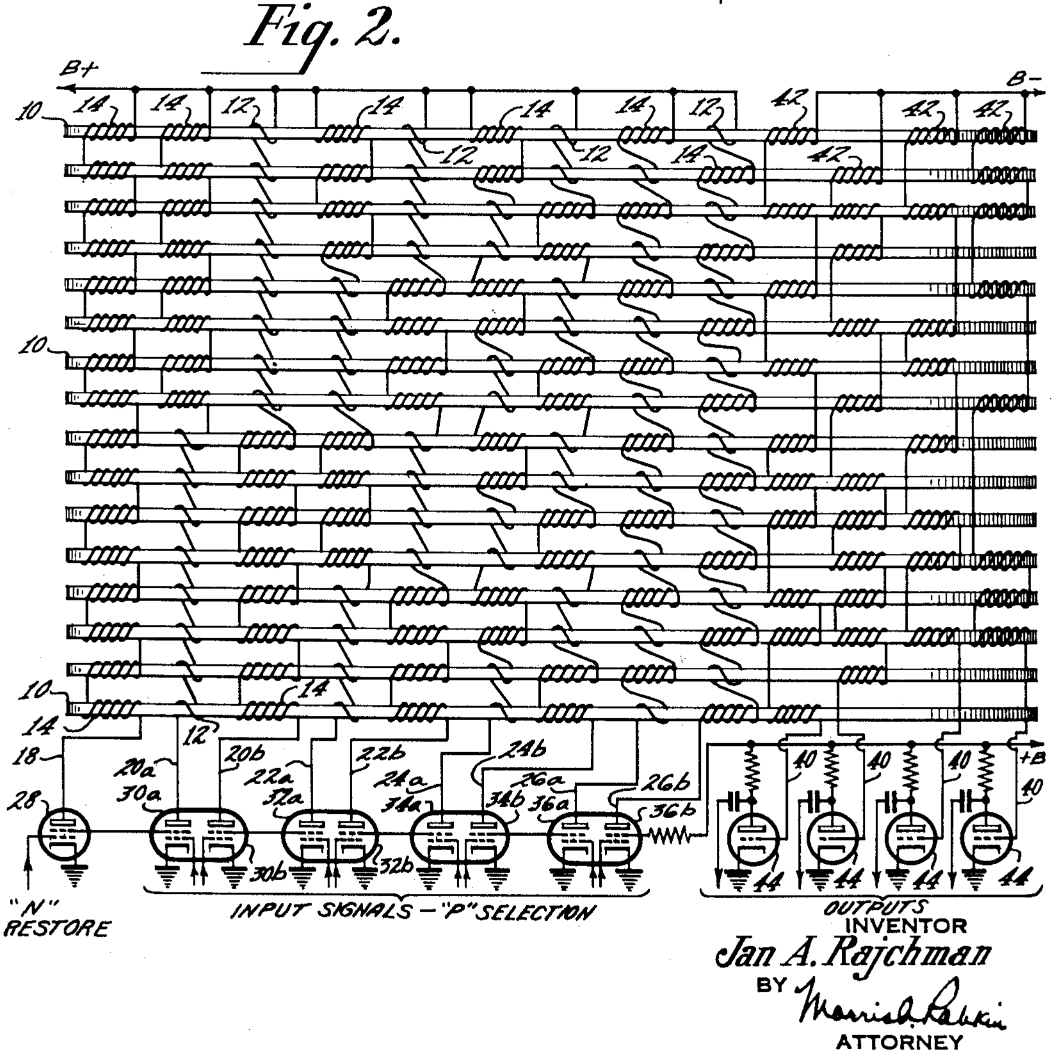
Figure 5:
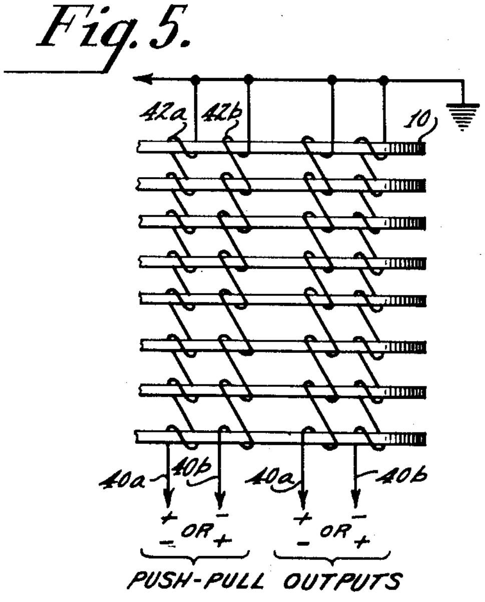
Figure 6:
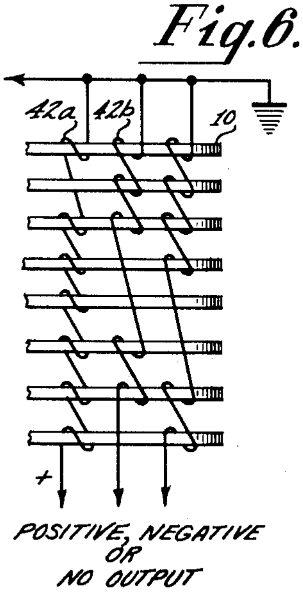
Figure 7:
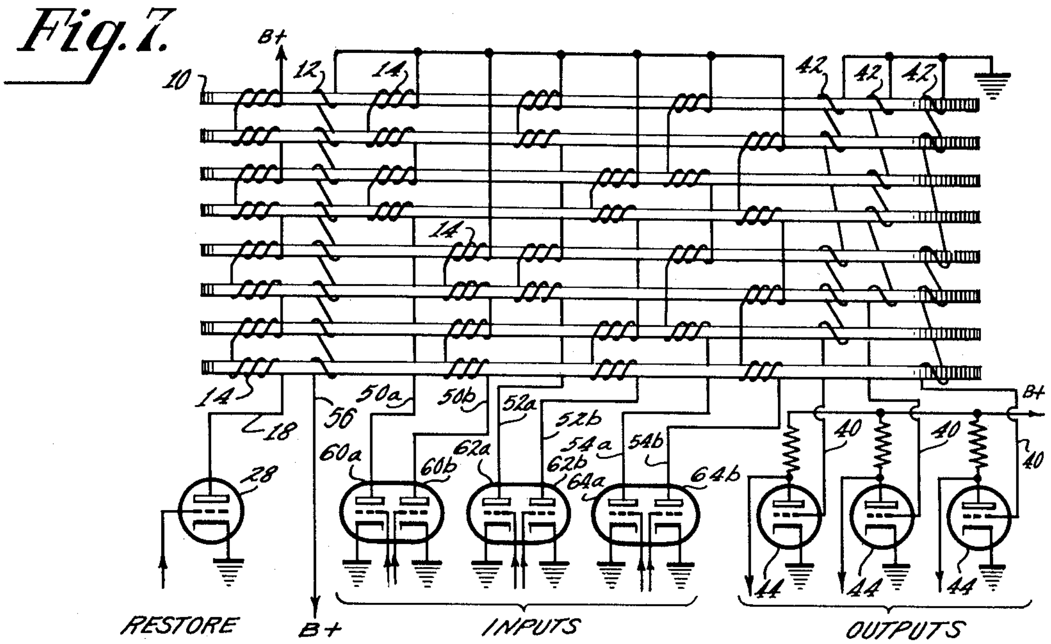
Figure 8:
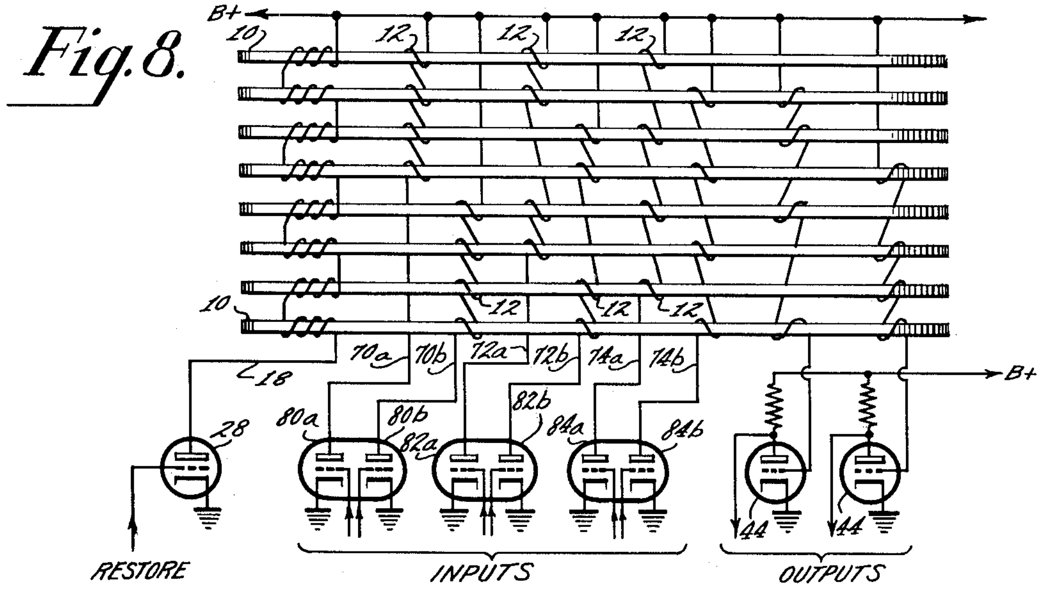
Figure 9:
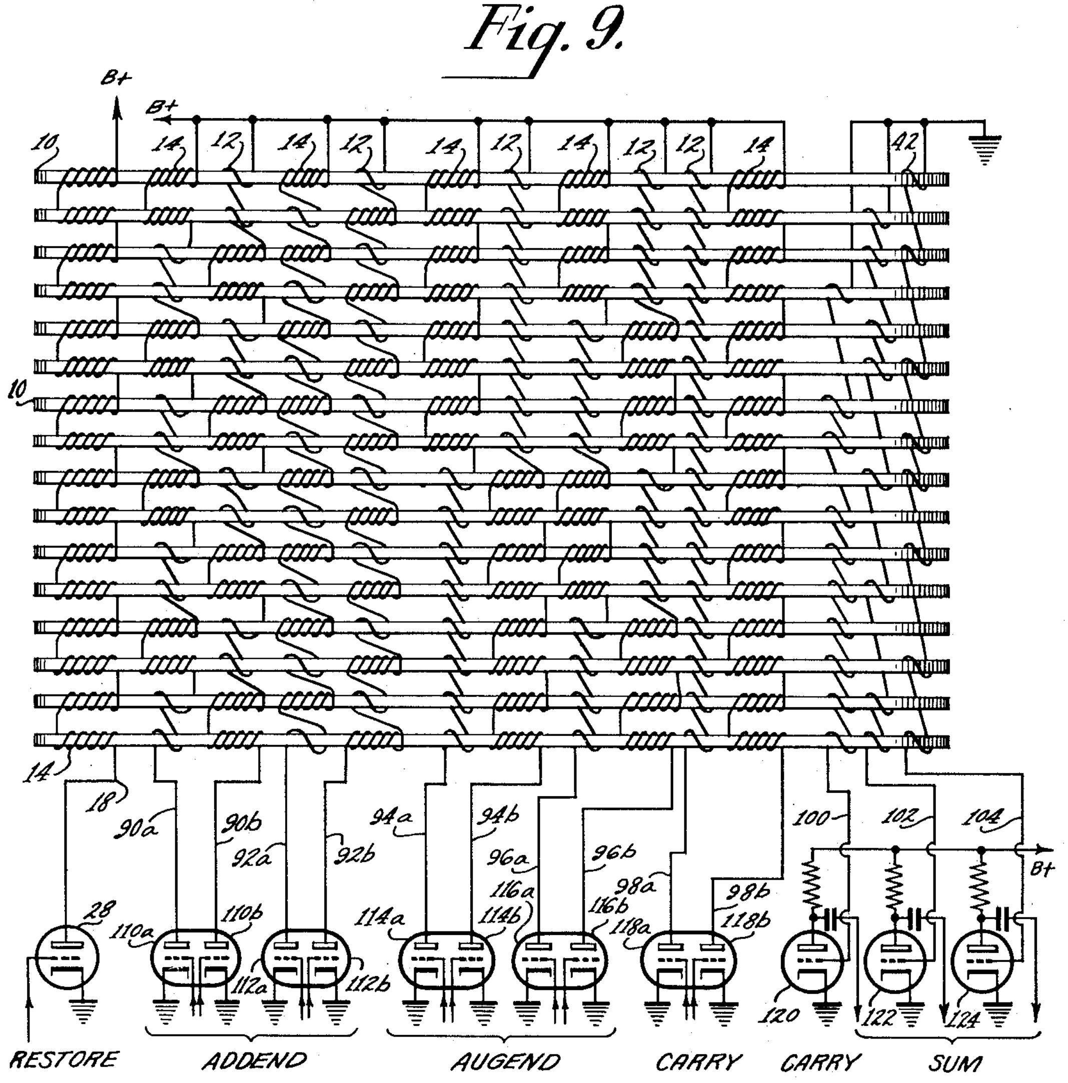

The novel features of the invention as well as the invention itself, both as to its organization and method of operation, will best be understood from the following description, when read in connection with the accompanying drawings, in which Figure 1 is a perspective view of toroidal cores and windings shown for the purposes of facilitating the explanation of the invention, Figure 2 is a circuit diagram of one embodiment of the invention, Figures 3, 4, 5 and 6 are circuit diagrams of the output sections of embodiments of the invention showing the different types of outputs available, Figures 7 and 8 are circuit diagrams of other embodiments of the invention, and Figure 9 is a circuit diagram of an embodiment of the invention used as a binary adder.

Reference is now made to Fig. 1, wherein there may be seen two cores 10. These cores are made of magnetic material having a substantially rectangular hysteresis loop. The shape preferred for the cores is toroidal. However, other suitable shapes may be used and it is not intended to limit the invention by this showing of the preferred embodiment. The cores 10 have windings 12, 14 upon them. These windings, when excited by current, provide magnetomotive forces which tend to drive the cores to saturation at one or the other polarity. The two windings 12 which drive a core in a first direction may have arbitrarily assigned thereto the designation of the "P" windings. The other windings 14 may have the designation of "N" windings. P windings 12 of one core may be serially connected with N or P windings of another core to comprise a coil. When the serially connected windings are all of one sense, the coil is designated as an N or P coil, depending upon the winding sense. As was previously described above in the discussion of application Serial No. 275,622 by this inventor, each one of the cores in a switch has a plurality of P and N windings thereon. The cores are usually placed in the same magnetic starting condition, namely, with an N polarity. The core which has applied thereto a magnetomotive force in excess of a critical value will be driven to the condition P. All other cores do not receive a magnetomotive force in excess of the required critical value and remain in condition N. Some of these cores may also receive a magnetizing force in the direction N, but since they are already saturated in the N direction there is substantially no change in their condition. By proper selection of the ratio of turns for the P windings and the N windings, it is possible to construct a switch wherein a selected core receives a substantial P magnetomotive force. All other cores receive either no magnetomotive force at all or else receive a magnetomotive force in the direction N. The method for selection of the turns is described and claimed in application Serial No. 275,622.

Reference is now made to Fig. 2 of the drawings. The magnetic material cores are represented in plan view and the winding turns are also shown in plan. The left part of the figure shows four pairs of input coils 20*a*, *b* to 26*a*, *b*. These input coils are coupled to each one of the cores 10 by windings 12, 14, the sense of which varies in accordance with the dictates of a desired combinatorial code. One coil 18, on the extreme left of the drawing, is inductively coupled to each of the cores by windings 14 which apply a magnetomotive force to drive the cores to the condition N only. This is known as the N restore coil. It is used to set up the cores for a new switching operation after the occurrence of a switching operation. Each coil serves as the plate load of a separate electron discharge tube 28, 30*a*, *b* to 36*a*, *b*. A plurality of output coils 40 are also shown coupled by windings 42 to each of the cores 10 in accordance with a desired combinatorial code. This code may have any desired relationship with the code of the input windings. Each of these output coils 40 is connected to apply a signal to the grid of an electron discharge tube 44. The output of each one of these tubes 44 serves as the output of the system. The code represented by the input and output windings may be seen by reference to Table I. The order of the table corresponds to the order of the cores from top to bottom.

TABLE I

| Inputs | | | | | Outputs | | | | |
|---|---|---|---|---|---|---|---|---|---|
| Signals | Windings | | | | Signals | Windings | | | |
| 0000 | NP | NP | NP | NP | 1011 | P | ---- | P | P |
| 0001 | NP | NP | NP | PN | 0101 | ---- | P | ---- | P |
| 0010 | NP | NP | PN | NP | 1111 | P | P | P | P |
| 0011 | NP | NP | PN | PN | 0100 | ---- | P | ---- | ---- |
| 0100 | NP | PN | NP | NP | 1001 | P | ---- | ---- | P |
| 0101 | NP | PN | NP | PN | 0110 | ---- | P | P | ---- |
| 0110 | NP | PN | PN | NP | 1010 | P | ---- | P | ---- |
| 0111 | NP | PN | PN | PN | 0101 | ---- | P | ---- | P |
| 1000 | PN | NP | NP | NP | 1010 | P | ---- | P | ---- |
| 1001 | PN | NP | NP | PN | 1100 | P | P | ---- | ---- |
| 1010 | PN | NP | PN | NP | 1110 | P | P | P | ---- |
| 1011 | PN | NP | PN | PN | 0111 | ---- | P | P | P |
| 1100 | PN | PN | NP | NP | 1101 | P | P | ---- | P |
| 1101 | PN | PN | NP | PN | 1111 | P | P | P | P |
| 1110 | PN | PN | PN | NP | 0100 | ---- | P | ---- | ---- |
| 1111 | PN | PN | PN | PN | 1000 | P | ---- | ---- | ---- |

The sense of the windings of a pair of coils on any given core is representative of a digit in a binary system. For example, considering the pair of input coils 20*a*, *b* on the left of the drawing, it may be seen that the coil pair windings on the uppermost core is an N winding 14 followed by a P winding 12. Referring to Table I, this represents the digit zero. Considering the same pair of coils and their windings which are coupled to the lowermost core, these consist of a P winding 12 followed by an N winding 14. Referring to Table I, this is representative of the digit 1. A simultaneous excitation is applied to one coil of each pair of coils and only one of the cores will have only the P windings 12 applying a driving magnetomotive force. No excited coils having N windings will apply a driving magnetomotive force to this particular core. Accordingly, the core having only P driving magnetomotive forces is driven to the condition P. This core in going from N to P induces a voltage in the output coils coupled by windings thereto. The output tubes 44 will accordingly be driven by these voltages. It should be noted that only the ones of the output tubes which are coupled to the cores having the windings in accordance with the selected code are the ones that are driven.

Considering again the input coils shown in Fig. 2, from the convention set up in Table I, it may be seen that, when in a pair of input coils only the left coil of the pair is excited, the digit 1 is called for in the binary position represented by the pair of coils. By exciting only the right coil of a pair of coils, the digit zero is called for in the binary position represented by the pair of coils. How this is arrived at may be seen by determining which input coil in each pair must be excited to turn over the core on which the input windings represent the binary 0000. This is the coil of the pair which calls for a zero when excited. As a check, exciting the other coil in each pair, the "one" coil, should result in the core on which the windings represent the binary 1111 being turned over. As an illustration, if it was desired to turn over a core which has windings on it representative of the number 1011, in the first input coil pair the coil 20*a* on the left side is excited. The next adjacent coil pair will have the excitation applied to the right sided coil 22*b*, representative of the digit zero. The next two coil pairs will have their left sided coils 24*a*, 26*a* excited. The fifth core from the bottom will be the only core receiving exclusively P winding driving forces and none other. This core will accordingly be driven from N to P. The sense of the windings on this core represents the digits 1011 as called for by the excitation. The output windings on the fifth core from the bottom according to the table are representative of the binary digit 0111. It should be noted that the convention adopted by the output windings is to couple to a core only when it is desired that an output from that core is to represent the digit 1. No coupling is made to a core when its output is to represent, for the particular position in a number under consideration, the digit zero. Accordingly, applying the first pattern of excitations to the switch results in a second pattern of excitations being received as output therefrom. The magnetic switch may be employed as either a code converter, function generator or universal switching device. Any desired input code can be converted to any desired output switching code merely by determining the pattern and sense of the winding occupancy on the cores. The conversion is determined by the desired codal interrelationships. The means to drive or excite the cores are shown as vacuum tubes. Pulse signals are applied to the grids of the tubes to render them conducting and non-conducting in accordance with a desired input code. Other known means to excite the coils may be used. The tubes may be replaced by driver magnetic cores which are coupled to the coils in the manner shown in my application Serial No. 275,622. When the driver magnetic cores have their polarity changed a voltage is induced in the coupled input coil which is effective for the purpose required.

The outputs shown in Figure 2 are arbitrarily chosen by way of example of outputs available for a given pattern of inputs. The number of turns used for the output coils is determined by the amount of output voltage required. The output windings are shown connected to the grids of normally non-conducting amplifier tubes 44. These are rendered conducting when a voltage is induced in the coil. Output is taken from the plates of these tubes.

Figure 3:
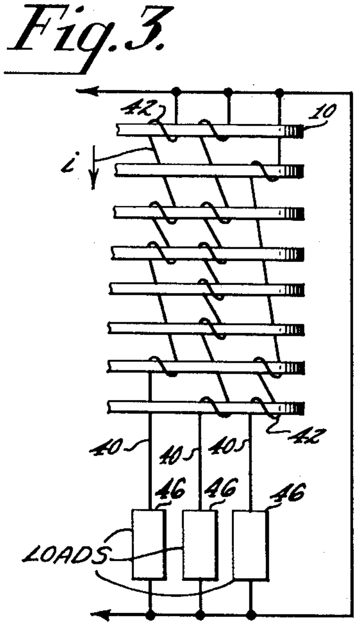

Variations in the types of outputs obtained may be made as desired. Referring now to Fig. 3 there may be seen the method of connection of the output coils 40 to any desired load 46. The loads 46 are represented by rectangles which have one lead connected to one end of the respective coils, and the other lead joined with and connected to the free ends of all the coils 40. The cores are shown in fragmentary fashion. The windings 42 of the output coils are coupled to the cores in accordance with a desired code.

Figure 4:
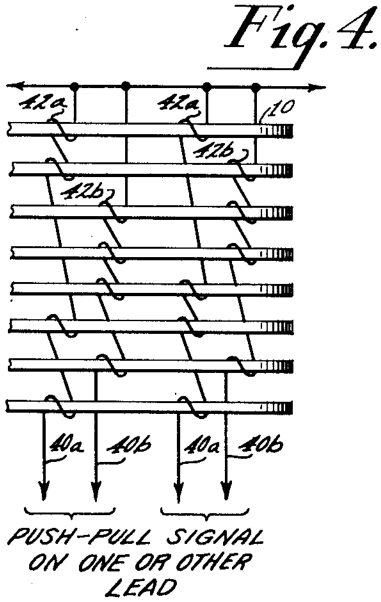

Figure 4 shows another method of coupling to the cores whereby push-pull outputs may be obtained in the output coils. The output coils 40*a*, *b* are paired off and they are coupled to each core so that one coil of a pair is coupled to a core to which the other coil of the pair is not coupled. The code selected for connecting these pairs of output coils is such that where one coil of a pair, assuming the left coil 40*a*, is coupled to a core it represents the digit 1. Where the other coil 40*b* of the pair (the right coil) is coupled to a core it represents the digit zero.

A push-pull output of the type where one signal on a pair of leads is positive and the other signal on a pair of leads is negative is shown in the coupling of the output coils, illustrated in Fig. 5. The coils 40a, b here are paired off and where one coil of a pair is coupled to a core with a winding 42a in a positive sense the other coil of the pair is coupled to the core with a winding 42b in the negative sense. The code for the coupling of the windings may be selected so that, for example, when the left coil 40a is coupled by a P sense winding and the right coil 40b is coupled by an N sense winding to a core, the digit 1 is represented. When the coupling sense is in reverse order the digit zero is represented.

Fig. 6 shows a method of coupling the output coils 40 to cores in order to obtain a positive output, a negative output or no output from a given core. The positive and negative outputs are obtained by choosing one winding 42a sense as representative of the positive output. The other winding 42b sense accordingly becomes a negative output and the absence of a coupling winding obviously represents no output.

Another advantage of this type of switch is that the number of turns of the output windings may be varied as desired so that the effective impedance of the switch as viewed from the leads may be adjusted at will. It is also possible to have different numbers of turns on the cores corresponding to different input combinations.

Fig. 7 is a circuit diagram of another pattern of core occupancy for the input coils which may be used for switching. The input coils 50a, b to 54a, b all are coupled to the cores 10 by N windings 14. The code selected is one wherein the first pair of input coils 50a, b are coupled to adjacent halves of the cores, the second pairs of coils 52a, b are coupled to the interleaving quarters of the cores and the third pair of coils 54a, b is coupled by N windings to interleaving eighths of the coils. Each one of the coils in the input is driven by a vacuum tube 60a, b to 64a, b. These input coils are coupled to the respective vacuum tubes as plate loads. The free ends of the input coils are connected together and are connected to one end of a coil 56. This coil is coupled to every one of the cores by windings 12 having a sense P. B+ is provided for all the input tubes through this common P coil 56. Excitation of one coil in each pair of the input coils results in only one core in the switch having applied thereto the magnetomotive force of the P coil solely. The remaining cores have at least an N driving magnetomotive force from one of the excited coils applied thereto. Accordingly, only one core will be driven in a direction P.

The same code is used to determine the pattern of core occupancy for the input windings of the input cores except that in place of a P winding on a core for a coil pair there is no winding. Accordingly, the input windings on the top core represent the binary 000, the bottom core has windings representative of 111 thereon and the other windings represent the binary numbers between these two. The "one" coil of a pair is the left coil 60a—64a, and the "zero" coil of a pair is the right coil 60b—64b.

The output coils 40 are, as previously described, coupled to the cores by windings 42 in accordance with a desired combinatorial code. There is also provided a common N restore coil 18 which is used to drive the cores to the starting polarity N. The input portion of the switch resembles the switch shown in Fig. 7 of my copending application Serial No. 275,622, filed March 8, 1952, for "Magnetic Matrix and Computing Devices." The input P coil has only one-third of the turns of any of the N input coils, since it carries three times the current of the excited N coils. The amplitude of the current applied to each coil is such that if, on any core, a P winding 12 is excited the opposing excitation of one N winding 14 should be sufficient to reduce the resultant magnetomotive force in the core below the critical value required to drive the core from N to P.

Figure 8 is the circuit diagram of another embodiment of the invention. It shows the input coils 70a, b through 74a, b as being coupled to the cores 10 by windings having only a P sense. Upon the excitation of one coil in each pair by one of the driver tubes 80a, b through 84a, b, only one of the cores receives excitation from three P sense windings. The remaining cores receive excitation from only one or two of the P sense windings. The number of turns of these windings and the current applied to them is selected so that the critical value for driving a core from N to P is provided only by the joint excitation of three P going windings. A common N restore coil 18 is provided which, upon excitation, restores the cores to the condition N. An output coil 40 is, or is not, connected to each of the cores in accordance with the desired relationship between the code of the connections of the output coils and the code of the connections of the input coils. The code selected for the coupling of windings on the cores shown in Fig. 8 is the same as that selected for Fig. 7, except that since the only input windings are in a P sense, the left coil of a pair is the "one" coil and the right coil of a pair is the "zero" coil. The output coils have the pattern of their couplings selected to represent the ability of the switching systems, to provide an output indicative of a mathematical computation, as well be more fully explained below.

The versatility of the system herein disclosed may best be illustrated by considering the embodiments of the invention shown in Figs. 8 and 9. These represent switches which are capable of performing the arithmetical operation of addition. In the addition of binary numbers, there are only two quantities or units of representation to be considered. A binary sum results in either a zero or a one. This may be conveniently represented by the presence or absence of a pulse, or voltage, or the order of windings as previously stated. The theory of binary addition can be found in many mathematical texts, one of them being "Elementary Number Theory," by J. V. Uspensky and M. A. Heaslet, McGraw-Hill Book Company, New York, 1939.

In a typical binary addition, there are, in general, three inputs: A digit of addend, a digit of augend and a carry-over digit from a preceding binary addition. There are two desired digits—the digit for the sum and the digit for the carry-over for the next binary addition. Table II shows the results of addition at one binary position.

TABLE II

*Addition at one binary position*

| Input Digits | | | Output Digits | |
|---|---|---|---|---|
| Addend | Augend | Carry-Over | Sum | Carry-Over |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

Consider now the circuit for an embodiment of the invention shown in Figure 8. If the coil pair to the left 70a, 70b, represent the addend, the next coil pair 72a, 72b the augend, the next coil pair 74a, 74b a carry-over from a previous addition, and the output coils 40 and 41 respectively the sum digit and carry-over, it can be shown that this embodiment of the invention can provide the output digits for a given set of input digits, as shown in Table II. If, for any pair of input coils, the left coil of a pair is coupled to a core by a P sense winding and the right coil of a pair is not coupled to a winding and this is taken to be representative of a digit zero and the reverse coupling order is taken to be representative of a digit one, then the order of the coupling of the input coil pairs to the cores in Figure 8 is representative of the input digits in Table II. The left coil of a pair 80*a*, 82*a*, 84*a* is the "zero" coil and the right coil of a pair is the "one" coil. The code adapted for the output coils is, an output coil is coupled to a core where a one is required in the output and is not coupled to a core where a zero is required in the output. Accordingly, the output tubes receive a pulse only when there is a "one" in the sum or carry-over. Of course, coil pairs may be provided in the manner shown previously to provide an output of one polarity for zero and another polarity for one.

The addition of 1 in the addend, 0 in the augend and 1 in the carryover would call for an excitation of the right coil 80*b* in the first coil pair, the left coil 82*a* in the second coil pair and the right coil 84*b* in the third coil pair. This would cause only the third core 10′ from the bottom, as shown in Figure 8, to be driven from N to P. This in turn would induce a voltage, only in the carry-over coil. Thus the tube driven by the output from the carry-over coil would indicate the proper addition.

The principles for the magnetic switch, as described heretofore, may be used for the one binary position addition or for addition in two or more binary positions. By way of illustration, Table III shows the addition for a two binary position input having applied thereto a one carry-over from a previous addition.

TABLE III

*Simultaneous addition in two binary positions*

| Inputs | | | Outputs | |
|---|---|---|---|---|
| Addend | Augend | Carry-over | Carry-over | Sum |
| 00 | 00 | 1 | 0 | 01 |
| 01 | 00 | 1 | 0 | 10 |
| 10 | 00 | 1 | 0 | 11 |
| 11 | 00 | 1 | 1 | 00 |
| 00 | 01 | 1 | 0 | 10 |
| 01 | 01 | 1 | 0 | 11 |
| 10 | 01 | 1 | 1 | 00 |
| 11 | 01 | 1 | 1 | 01 |
| 00 | 10 | 1 | 0 | 11 |
| 01 | 10 | 1 | 1 | 00 |
| 10 | 10 | 1 | 1 | 01 |
| 11 | 10 | 1 | 1 | 10 |
| 00 | 11 | 1 | 1 | 00 |
| 01 | 11 | 1 | 1 | 01 |
| 10 | 11 | 1 | 1 | 10 |
| 11 | 11 | 1 | 1 | 11 |

Figure 9 represents a switch which is capable of performing this addition. In Fig. 9 there may be seen input coil pairs for the addend, 90*a*, *b*—92*a*, *b*, augend 94*a*, *b*, 96*a*, *b* and carry 98*a*, *b*. The digit output for the sum carry is represented by one coil 100 and the two digits of the sum by two coils 102, 104. These are single ended outputs but any one of the previously shown output coil variations may be used. Since there are two binary digits in the addend there are two coil pairs, one for each digit. The convention for the winding sense of a coil pair corresponding to a digit is the same as was shown and described in Fig. 2. A digit 0 is represented by the winding to the left being in the N sense and the winding to the right being in the P sense for a given digit representative coil pair. The digit 1 requires the left winding in a coil pair to be in a P sense and the right winding in a coil pair to be in the N sense. With this convention established excitation of the right or "*a*" coil of a coil pair calls for digit zero, excitation of the left or "*b*" coil of a coil pair calls for the digit one. An electron discharge tube 110*a*, *b* through 118*a*, *b* is provided for excitation of each coil of the input as heretofore. Each tube has an input coil connected thereto as its plate load. Each of the output coils are respectively connected to the grid of a separate electron discharge tube 120, 122, 124. A common N restore coil 18 is provided which restores each of the cores to the initial polarity N. Assuming, for the purposes of illustration, that it is desired to add the binary digit 10 to 01, and a 1 carry-over is present from the previous addition. Pulses will be applied to excite the left tube 110*a* in the first pair for the addend, the right tube 112*b* in the second pair for the addend, the right tube 114*b* in the first pair for the augend, the left tube 116*a* in the second pair for the augend and the left tube 118*a* in the carry-over pair. This will cause a current to flow in the addend "one—zero" coils, the augend "zero—one" coils, and the carry one coil. The seventh core from the top of the drawing, in Fig. 9, designated as 10′ receives a drive from all the windings 12 having a P sense. No drive is received from any of the N going windings 14. Accordingly, only that core 10′ will be driven from N to P.

Regarding the three output coils, the output coil 100 to the left will have a voltage induced therein and none of the others 102, 104. This corresponds to a 1 carry and two zeroes in the sum. This is the correct sum. Therefore, only the carry tube 120 will provide an output signal.

The principle explained and illustrated herein may be expanded to include decimal addition, using the magnetic switch, for any desired number of digits.

The winding pattern for the coils can be established by means of a table for the inputs and for the desired corresponding outputs, in the manner shown. For the decimal addition of two decimal digits coded in the binary form, it can be shown that there are 200 possible configurations of inputs. Therefore, 200 cores would be required for such a switch. There are nine possible inputs, four for decimal addition of the addends and augends and one for carry-over.

The scheduling of pulses for the function matrix switch described herein is analogous to that of the switch described in my application 275,622. There are always two steps in the schedule corresponding to the two directions of remanent magnetization of a selected core. In the first step a core is selected by the input windings and brought from N to P. This causes signals of a definite polarity in the output circuits. In the second step the selected core is restored to N by a winding common to all cores. This causes a signal of opposite polarity in the output circuits. Circuits to achieve this sequence of pulse scheduling are well known in the art. For example, a bistable trigger circuit of the kind described in Theory and Applications of Electron Tubes by Herbert J. Reich, chapter 10, McGraw-Hill Publishing Company, 1944, may be actuated by an output from the switch after the application of an input to apply a pulse to excite the N restore coil. For applications in which a switch function varies from one case to another, output windings can be made consisting of only one turn and variations may be taken care of by threading or not threading the one turn wires through the cores of a switch. Alternatively, two sets of output coils may be used having two different combinatorial code relationships to an input code and output may be derived from the output windings whose relationship is desired.

It should be understood that all the input coils are always excited simultaneously by a current pulse in order to operate the switch.

There has accordingly been described herein a novel, simple, rugged and long lasting magnetic switching system. Since the materials used are magnetic, it is believed that no component failures will occur.

What is claimed is:

1. A magnetic switch comprising a plurality of magnetic cores, a plurality of windings on each of said magnetic cores, said plurality of windings being divided into a set of input windings and a set of output windings, means connecting one winding on each core in said input sets of windings in series with one winding on the others of said cores in accordance with a first desired combinatorial code to form a plurality of input coils, means connecting one winding on each core in the output sets of windings in series with one winding on others of said cores in accordance with a second desired combinatorial code having a desired relation to said first code, and means to apply currents to selected ones of said plurality of input coils to cause a change in the magnetic condition of a desired one of said elements whereby a voltage is induced in the windings of said output set which are on said desired core.

2. A magnetic switch comprising a plurality of magnetic cores, a first plurality of coils, each of said first plurality of coils being inductively coupled to different ones of said magnetic cores in accordance with a first desired combinatorial code, a second plurality of coils, each of said second plurality of coils being inductively coupled to different ones of said magnetic cores in accordance with a second desired combinatorial code, a utilization device connected to each of the coils in said second set, and means to apply current to selected ones of said first plurality of coils to cause a change in magnetic condition of a desired one of said cores whereby voltages are induced in each of the coils of said second plurality of coils which are coupled to said desired one of said cores and are applied to the utilization devices connected to said coils.

3. A magnetic switch as recited in claim 2 wherein said means to apply currents to selected ones of said first plurality of coils includes a first plurality of electron discharge tubes, each having an anode, grid and cathode, each of said first plurality of coils being connected to the anode of a different one of said first plurality of tubes.

4. A magnetic switch as recited in claim 2 wherein each said utilization device includes an electron discharge tube having an anode, cathode and control grid, the control grid of each said tube being coupled to the coil with which said utilization device is associated.

5. A magnetic switch as recited in claim 2 wherein said cores are toroidal in shape and are made of a magnetic material having substantially a rectangular hysteresis characteristic.

6. A magnetic switch comprising a plurality of magnetic cores, a plurality of windings on each of said magnetic cores, said plurality of windings being divided into a set of input windings and a set of output windings, half the windings in said input set being wound in one sense, the other half of said input set of windings being wound in an opposite sense, means connecting in series windings in said input set in one sense on some of said elements with windings in said input set in an opposite sense on others of said elements in accordance with a desired combinatorial code to form a set of input coils, means connecting the sets of output windings on all said cores in series in accordance with a desired combinatorial code to form a set of output coils, a separate utilization device connected to each one of said output coils, and means to apply currents to selected ones of said input coils to excite all the windings in one sense on one core whereby the magnetic condition of only said one element is altered and voltages are induced only in the output coils having windings on said one core which voltages are applied to the utilization devices connected to the excited output coils.

7. A magnetic function generator switch comprising a plurality of magnetic cores, a plurality of pairs of input coils inductively coupled to each of said cores by windings, the sense of the windings of one coil of a pair being opposite to the sense of the windings of the other coil of a pair, the sense of the windings on a core for each pair of coils being selected to have one order to represent one digit in a numerical system and the opposite order to represent another digit in said numerical system, said pairs of input coils having the sense of their windings arranged on said cores to represent a first numerical function table, a plurality of output coils, each of said coils being inductively coupled by windings to certain ones of said cores in accordance with a second numerical function table having a desired functional relationship to said first numerical function table, means to apply a current to one of each of said pairs of input coils in accordance with a first numerical function to excite all the windings in one sense on the one of said cores wherein said windings represent said first function whereby the magnetic condition of only said core is altered thereby inducing a voltage in the ones of said output coils coupled to said core, said excited coils being representative of a second function related to said first function utilization devices connected to each of said output coils, and means to restore all said cores to a given starting magnetic condition.

8. A magnetic function generator switch as recited in claim 7 wherein said means to restore all said cores to a given starting magnetic condition includes a restoring coil inductively coupled to each of said plurality of magnetic cores by a winding, and means to apply a current to said restoring coil.

9. A magnetic function generator switch as recited in claim 7 wherein said cores have a toroidal shape and are made of a magnetic material having a substantially rectangular hysteresis characteristic.

10. A magnetic function generator switch comprising a plurality of magnetic cores, a plurality of input coils, a first one of said plurality of input coils being inductively coupled by windings having one sense to each one of said cores, each of the remainder of said input coils being coupled by windings having an opposite sense to certain ones of said magnetic cores in accordance with a first desired combinatorial code, a plurality of output coils, each of which is inductively coupled by windings to certain ones of said magnetic cores in accordance with a second desired combinatorial code related to said first combinatorial code, means to apply currents to said first one of said input coils and to selected ones of the others of said input coils to apply a magnetomotive force solely from said first input coil to a desired one of said cores and none other, whereby only said one core has its magnetic condition substantially altered, thereby inducing a voltage in each of the output coils coupled to said core, the ones of said output coils in which said output voltages are induced being representative of a function of the pattern of the application of exciting currents to said input coils, and means to restore all of said cores to a given initial condition of magnetization.

11. A magnetic function generator switch as recited in claim 10 wherein said first one of said plurality of input coils has one end connected to one end of each of the others of said plurality of input coils, and said means to apply currents to said first one of said input coils and to selected ones of the others of said input coils includes a plurality of electron discharge tubes each having anode, cathode and control grids, each of said others of said input coils being connected to the anodes of a different one of said tubes.

12. A magnetic binary addition device comprising a plurality of cores of magnetic material having substantially a rectangular hysteresis characteristic, a plurality of pairs of input coils inductively coupled to each of said cores by windings, the sense of the windings of one coil of a pair being opposite to the sense of the windings of the other coil of a pair, the sense of the windings on a core for each pair of coils having one order to represent a binary one and the reverse order to represent a binary zero, said plurality of pairs of input coils being divided into addend, augend and carry-over sets of input coil pairs, said addend set having the order of the sense of its windings on each of the cores determined in accordance with a progression of numbers in the binary system which constitute addends, said augend set of input coil pairs having the order of the sense of its windings on each of the cores determined in accordance with a progression of numbers in the binary system which constitute augends to be combined with said addends, said carryover set constituting one pair of input coils having the order of the sense of its windings on each of the cores determined by whether or not a carryover term is to be added to the augend and addend terms represented by the windings on a particular core, a plurality of output coils, the number of output coils being equal to the number of digits required to express the largest sum plus one digit to express carry-over, each of said output coils being assigned to an order position in a binary sum, each of said coils being coupled to those of said cores wherein the sum of the numbers represented by the input coil windings on said cores has a binary one in the order position represented by said coil, means to apply currents to said addend, augend and carry-over coil pairs to excite all the windings in one sense on a core to alter the magnetic condition of said core whereby voltages are excited in the ones of said output coils coupled to said altered core thereby providing a representation of the sum of the addend, augend and carryover digits represented by said input coil exciting currents, and coil means to restore all said magnetic cores to a given starting polarity.

13. A magnetic binary addition device as recited in claim 12 wherein said means to apply current to said addend, augend and carryover coil pairs comprise a plurality of electron discharge tubes each having an anode, cathode and control grid, each having a different one of said coils connected to its anode as a plate load.

14. A magnetic binary addition device as recited in claim 12 wherein said means to restore all said magnetic cores to a given starting condition comprises a restoring coil inductively coupled to each of said plurality of magnetic cores by a winding, and an electron discharge tube having an anode, cathode, and control grid, said restoring coil being connected to the anode of said tube as a plate load.

15. A magnetic binary arithmetic device comprising a plurality of magnetic cores, a plurality of pairs of input coils inductively coupled to each of said cores by windings, the sense of the windings of one coil of a pair being opposite to the sense of the windings of the other coil of a pair, the sense of the windings on a core for each pair of coils having one order to represent a binary one and the reverse order to represent a binary zero, said plurality of pairs of input coils being divided into groups of input coil pairs, each of said coil groups having the sense of the coil pair windings on each of the cores determined in accordance with a progression of numbers in a number system which are to be arithmetically combined, a plurality of output coils, the number of output coils being equal to the number of digits required to express the largest number resulting from said arithmetic combination, each of said output coils being assigned to an order position in said largest number, each of said output coils being coupled to those of said cores wherein the arithmetic combination of the numbers represented by the input coil windings coupled thereto have a binary one in the order position represented by said coil, means to selectively apply currents to said input coil pair groups to excite all the windings in one sense on a core to alter the magnetic condition of said core, whereby voltages are excited in the ones of said output coils coupled to said altered core thereby providing a representation of the arithmetic combination of numbers represented by said selectively excited input coils, and means to restore all said magnetic cores to a given starting polarity.

16. A magnetic binary arithmetic device as recited in claim 15 wherein said cores are toroidal in shape and are made of a magnetic material having a substantially rectangular hysteresis characteristic.

17. A magnetic binary arithmetic device as recited in claim 15 wherein said means to restore all said magnetic cores to a given starting polarity comprises a restoring coil inductively coupled to each of said plurality of magnetic cores by a winding, and an electron discharge tube having an anode, cathode, and control grid, said restoring coil being connected to the anode of said tube as a plate load.

References Cited in the file of this patent

UNITED STATES PATENTS 2,590,950 Eckert ------------------ Apr. 1, 1952

OTHER REFERENCES

"Progress Report (2) on the Edvac," Moore School of Electrical Engineering, Univ. of Pa., June 30, 1946, declassified Feb. 13, 1947; pages 4–22, 22A, 23, 23A.

"Digital Information Storage in Three Dimensions Using Magnetic Cores," J. Forrester, Journal of Applied Physics, vol. 22, No. 1, January 1951, pages 44 to 48.

"Magnetic Cores as Elements of Digital Computing Systems," M. K. Haynes, Ph. D. Thesis, Univ. of Illinois, 1950, pages 50–52 and Fig. 41, page 60.